United States Patent
Borgendale et al.

(10) Patent No.: US 8,327,381 B2
(45) Date of Patent: Dec. 4, 2012

(54) REFERENCING MESSAGE ELEMENTS IN AN APPLICATION MESSAGE IN A MESSAGING ENVIRONMENT

(75) Inventors: Kenneth W. Borgendale, Austin, TX (US); John J. Duigenan, New York, NY (US); Foluso O. Okunseinde, Austin, TX (US); Cornell G. Wright, Jr., Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1486 days.

(21) Appl. No.: 11/609,708

(22) Filed: Dec. 12, 2006

(65) Prior Publication Data

US 2008/0141276 A1 Jun. 12, 2008

(51) Int. Cl.
G06F 17/30 (2006.01)
(52) U.S. Cl. ......... 719/313; 719/315; 709/206; 709/207
(58) Field of Classification Search ..................... None
See application file for complete search history.

(56) References Cited

U.S. PATENT DOCUMENTS

| | | | |
|---|---|---|---|
| 4,787,035 A | 11/1988 | Bourne | |
| 4,947,429 A | 8/1990 | Bestler et al. | |
| 5,195,092 A | 3/1993 | Wilson et al. | |
| 5,732,274 A | 3/1998 | O'Neill | |
| 5,809,028 A | 9/1998 | Nethercott et al. | |
| 5,809,337 A | 9/1998 | Hannah et al. | |
| 5,940,843 A | 8/1999 | Zucknovich et al. | |
| 5,987,432 A | 11/1999 | Zusman et al. | |
| 6,125,391 A | 9/2000 | Meltzer et al. | |
| 6,141,324 A | 10/2000 | Abbott et al. | |
| 6,160,874 A | 12/2000 | Dickerman et al. | |
| 6,694,316 B1 | 2/2004 | Langseth et al. | |
| 6,725,446 B1 | 4/2004 | Hahn et al. | |
| 6,757,710 B2 | 6/2004 | Reed | |
| 6,901,428 B1 | 5/2005 | Frazier et al. | |
| 6,910,078 B1 | 6/2005 | Raman et al. | |

(Continued)

FOREIGN PATENT DOCUMENTS

EP 1 039 410 A 9/2000

(Continued)

OTHER PUBLICATIONS

Office Action Dated May 27, 2009 in U.S. Appl. No. 11/426,857.

(Continued)

Primary Examiner — Andy Ho
Assistant Examiner — Syed Roni
(74) Attorney, Agent, or Firm — DeLizio Gilliam, PLLC

(57) ABSTRACT

Methods, systems, and products are disclosed for referencing message elements in an application message in a messaging environment that include: establishing a message model on a computer, the message model comprising message element specifications that each specify a message element for storing data in the application messages, each message element specification comprising element characteristics; creating, by a messaging module on the computer in dependence upon the message model, a message element designator map that maps a separate message element designator to each message element specified by the message model; receiving, in the messaging module from a requesting module, a request for an element designator for a specific message element identified by the element characteristics for the specific message element; and providing, by the messaging module to the requesting module, the requested element designator in dependence upon the message element designator map and the element characteristics for the specific message element.

20 Claims, 7 Drawing Sheets

U.S. PATENT DOCUMENTS

| | | | |
|---|---|---|---|
| 6,954,454 B1 | 10/2005 | Schuster et al. | |
| 7,113,520 B1 | 9/2006 | Meenan | |
| 7,120,165 B2 | 10/2006 | Kasvand-Harris et al. | |
| 7,225,195 B2 | 5/2007 | Avrahami et al. | |
| 7,283,904 B2 | 10/2007 | Benjamin et al. | |
| 7,415,715 B2 | 8/2008 | Fradkov et al. | |
| 7,448,043 B2 | 11/2008 | Shenfield et al. | |
| 2001/0016783 A1 | 8/2001 | Graumann et al. | |
| 2001/0049743 A1 | 12/2001 | Phippen et al. | |
| 2002/0019812 A1 | 2/2002 | Board et al. | |
| 2002/0022952 A1 | 2/2002 | Zager et al. | |
| 2002/0023040 A1 | 2/2002 | Gilman et al. | |
| 2002/0083097 A1 | 6/2002 | Warrington | |
| 2002/0086688 A1 | 7/2002 | Kang | |
| 2002/0161900 A1 | 10/2002 | Brown et al. | |
| 2002/0169706 A1 | 11/2002 | Chandra et al. | |
| 2002/0172155 A1 | 11/2002 | Kasvand-Harris et al. | |
| 2003/0073406 A1 | 4/2003 | Benjamin et al. | |
| 2003/0115291 A1 | 6/2003 | Kendall et al. | |
| 2003/0115548 A1 | 6/2003 | Melgar | |
| 2003/0158805 A1* | 8/2003 | Mozhdehi | 705/37 |
| 2003/0204719 A1 | 10/2003 | Ben-Itzhak | |
| 2004/0024753 A1 | 2/2004 | Chane et al. | |
| 2004/0024845 A1 | 2/2004 | Fishhaut et al. | |
| 2004/0034591 A1 | 2/2004 | Waelbroeck et al. | |
| 2004/0054744 A1* | 3/2004 | Karamchedu et al. | 709/206 |
| 2004/0148357 A1 | 7/2004 | Corrigan et al. | |
| 2004/0190459 A1 | 9/2004 | Ueda et al. | |
| 2004/0193703 A1 | 9/2004 | Loewy et al. | |
| 2004/0199524 A1 | 10/2004 | Rys et al. | |
| 2004/0205439 A1 | 10/2004 | Carmeli et al. | |
| 2004/0216135 A1 | 10/2004 | Heimbeck | |
| 2005/0010311 A1 | 1/2005 | Barbazette et al. | |
| 2005/0028195 A1 | 2/2005 | Feinleib et al. | |
| 2005/0028208 A1 | 2/2005 | Ellis et al. | |
| 2005/0044197 A1 | 2/2005 | Lai | |
| 2005/0102218 A1 | 5/2005 | Sargent et al. | |
| 2005/0105533 A1 | 5/2005 | Malolepsy et al. | |
| 2005/0149543 A1 | 7/2005 | Cohen et al. | |
| 2005/0195820 A1 | 9/2005 | Betts et al. | |
| 2005/0222931 A1 | 10/2005 | Mamou et al. | |
| 2005/0246186 A1 | 11/2005 | Nikolov | |
| 2005/0246423 A1 | 11/2005 | Starbuck et al. | |
| 2005/0254508 A1 | 11/2005 | Aksu et al. | |
| 2005/0261923 A1 | 11/2005 | Brown et al. | |
| 2005/0262025 A1 | 11/2005 | Wajih et al. | |
| 2005/0273408 A1 | 12/2005 | Bandman et al. | |
| 2006/0085507 A1 | 4/2006 | Zhao et al. | |
| 2006/0143307 A1 | 6/2006 | Codignotto | |
| 2006/0149840 A1 | 7/2006 | Thompson et al. | |
| 2006/0206440 A1 | 9/2006 | Anderson et al. | |
| 2006/0242240 A1 | 10/2006 | Parker et al. | |
| 2006/0269148 A1 | 11/2006 | Farber et al. | |
| 2007/0038543 A1 | 2/2007 | Weinstein | |
| 2007/0038712 A1 | 2/2007 | Affronti et al. | |
| 2007/0073907 A1 | 3/2007 | Factor et al. | |
| 2007/0091789 A1 | 4/2007 | Thukral | |
| 2007/0106813 A1 | 5/2007 | Bordes et al. | |
| 2007/0150918 A1 | 6/2007 | Carpenter et al. | |
| 2007/0233728 A1 | 10/2007 | Puteick et al. | |
| 2007/0261041 A1* | 11/2007 | Amini et al. | 717/148 |
| 2007/0271447 A1 | 11/2007 | Agarwala et al. | |
| 2007/0299936 A1 | 12/2007 | Borgendale et al. | |
| 2007/0299973 A1 | 12/2007 | Borgendale et al. | |
| 2007/0300233 A1 | 12/2007 | Bhogal et al. | |
| 2007/0300234 A1 | 12/2007 | Dekel et al. | |
| 2007/0300235 A1 | 12/2007 | Dekel et al. | |
| 2008/0010487 A1 | 1/2008 | Dekel et al. | |
| 2008/0069141 A1 | 3/2008 | Bonaguro et al. | |
| 2008/0103949 A1 | 5/2008 | Lobana et al. | |
| 2008/0104266 A1 | 5/2008 | Dekel et al. | |
| 2008/0114839 A1 | 5/2008 | Borgendale et al. | |
| 2008/0114938 A1 | 5/2008 | Borgendale et al. | |
| 2008/0137830 A1 | 6/2008 | Bhogal et al. | |
| 2008/0140550 A1 | 6/2008 | Berezuk et al. | |
| 2008/0141272 A1 | 6/2008 | Borgendale et al. | |
| 2008/0141273 A1 | 6/2008 | Borgendale et al. | |
| 2008/0141275 A1 | 6/2008 | Borgendale et al. | |
| 2008/0141276 A1 | 6/2008 | Borgendale et al. | |
| 2008/0243675 A1 | 10/2008 | Parsons et al. | |
| 2008/0244017 A1 | 10/2008 | Gershinsky et al. | |
| 2009/0006559 A1 | 1/2009 | Bhogal et al. | |
| 2009/0006560 A1 | 1/2009 | Bhogal et al. | |
| 2009/0024498 A1 | 1/2009 | Berezuk et al. | |

FOREIGN PATENT DOCUMENTS

| | | |
|---|---|---|
| EP | 2007/055851 | 6/2007 |
| WO | WO9900753 A1 | 1/1999 |
| WO | WO 2005/045670 A | 5/2005 |

OTHER PUBLICATIONS

Office Action Dated Jun. 1, 2009 in U.S. Appl. No. 11/769,240.
Office Action Dated Feb. 24, 2009 in U.S. Appl. No. 11/609,696.
Office Action Dated May 20, 2009 in U.S. Appl. No. 11/426,819.
Office Action Dated Jun. 2, 2009 in U.S. Appl. No. 11/426,864.
Office Action Dated Jun. 22, 2009 in U.S. Appl. No. 11/769,243.
Office Action Dated Jun. 25, 2009 in U.S. Appl. No. 11/426,849.
Neville, Jennifer et al. "Using relational knowledge discovery to prevent securities fraud." Proceedings of the eleventh ACM SIGKDD international conference on Knowledge discovery in data mining. Aug. 2005. ACM Press. 449-458.
Office Action Dated Dec. 10, 2009 in U.S. Appl. No. 11/426,849.
Office Action Dated Aug. 18, 2009 in U.S. Appl. No. 11/609,566.
Office Action Dated Jan. 22, 2010 in U.S. Appl. No. 11/609,604.
Final Office Action Dated Aug. 14, 2009 in U.S. Appl. No. 11/567,898.
Office Action Dated Aug. 28, 2009 in U.S. Appl. No. 11/426,789.
Final Office Action Dated Dec. 2, 2009 in U.S. Appl. No. 11/426,864.
Final Office Action Dated Apr. 17, 2009 in U.S. Appl. No. 11/780,826.
Office Action Dated Oct. 30, 2008 in U.S. Appl. No. 11/780,826.
Office Action Dated Mar. 19, 2009 in U.S. Appl. No. 11/559,425.
Office Action Dated May 6, 2009 in U.S. Appl. No. 11/559,434.
Office Action Dated May 8, 2009 in U.S. Appl. No. 11/586,076.
Office Action Dated Mar. 6, 2009 in U.S. Appl. No. 11/426,764.
Office Action Dated Feb. 6, 2009 in U.S. Appl. No. 11/567,898.
Office Action Dated Apr. 6, 2009 in U.S. Appl. No. 11/608,904.
Office Action Dated Apr. 14, 2009 in U.S. Appl. No. 11/780,826.
Final Office Action, U.S. Appl. No. 11/609,604, Apr. 19, 2010.
Office Action, U.S. Appl. No. 11/609,708, Apr. 19, 2010.
Final Office Action, U.S. Appl. No. 11/609,708, Sep. 8, 2010.
Office Action, U.S. Appl. No. 11/426,789, Oct. 6, 2010.
Office Action, U.S. Appl. No. 11/567,357, May 27, 2010.
Final Office Action, U.S. Appl. No. 11/567,357, Oct. 27, 2010.
Final Office Action, U.S. Appl. No. 11/426,849, Aug. 17, 2010.
Office Action, U.S. Appl. No. 11/728,850, Jul. 27, 2010.
Notice of Allowance, U.S. Appl. No. 11/728,850, Nov. 22, 2010.
"PCQuote.com Releases PCQuote Oribit", PR Newswire, New York: Nov. 2, 1999. p. 1.
"FirstQuote Provides Financial Information Services for Brokat E-Finance Application", PR newswire, New York: Feb. 21, 2000.
Speakman, et al.; RFC 3208—PGM Reliable Transport Protocol Specification; www.faqs.org; 2001; pp. 1-72; RFC 3208; Network Working Group.
PCT Search Report and Written Opinion, Jun. 5, 2008; PCT Application No. PCT/EP2007/063194.
PCT Search Report and Written Opinion, Feb. 4, 2008; PCT Application No. PCT/EP2007/063239.
PCT Search Report and Written Opinion, Jul. 7, 2008; PCT Application No. PCT/EP2008/053370.
PCT Search Report and Written Opinion, Sep. 14, 2007; PCT Application No. PCT/EP2007/055851.

* cited by examiner

US 8,327,381 B2

REFERENCING MESSAGE ELEMENTS IN AN APPLICATION MESSAGE IN A MESSAGING ENVIRONMENT

BACKGROUND OF THE INVENTION

1. Field of the Invention

The field of the invention is data processing, or, more specifically, methods, systems, and products for referencing message elements in an application message in a messaging environment.

2. Description of Related Art

Messaging environments are generally available to provide data communication between message sending devices and message receiving devices using application messages. An application message is a quantity of data organized into one or more data fields and is passed from a message producer installed on a message sending device to a message consumer installed on a message receiving device. An application message is a form of message recognized by application software operating in the application layer of a data communication protocol stack—as contrasted for example with a transport message or network message which are forms of messages recognized in the transport layer and the network layer respectively. An application message may represent, for example, numeric or textual information, images, encrypted information, and computer program instructions.

For an example of an application message, consider a financial market data environment. A financial market data environment is a data processing environment used to communicate information about financial markets and participants in financial markets. In a financial market data environment, an application message is commonly referred to as a 'tick' and includes financial market data such as, for example, financial quotes or financial news. Financial quotes include bid and ask prices for any given financial security. A 'bid' refers to the highest price a buyer is willing to pay for a security. An 'ask' refers to the lowest price a seller is willing to accept for a security.

Application messages in current messaging environments are typically created and interpreted according to a message model. The message model specifies the message format used to interpret the application messages. An application message is composed of one or more message elements, each message element is a message field or a message data structure composed of multiple message fields or other data structures. The message model includes information regarding the format and other characteristics of each of the message elements in application messages. For example, the message model may specify the type of each message element, the offset of each message element from the beginning of the message, the size of each message element, and the name of each message element.

When an application accesses a particular message element of an application message, the application typically utilizes a messaging module that performs messaging functions and interacts with the message model. Such messaging functions may include, for example, retrieving a value for a particular message element in an application message or storing a value for a particular message element in an application message. When a messaging module receives a request from an application to perform a messaging function using a message element, the messaging module retrieves information about the message element from the message model. To retrieve information about a particular message element from a message model, the messaging module typically searches the message model for the specification of the particular message element and retrieves the format data or other characteristics from the specification in the message model used to perform the requested messaging function. Typically, the messaging module performs the search through the message model using string operations, which are expensive operations that often consume more computer resource than other operations such as, for example, numeric operations. Because the messaging module often searches the message model many times for specification data regarding the same message element, large quantities of computer resources are typically consumed searching for the same data over and over again. As such, readers will therefore appreciate that room for improvement exists for referencing message elements in an application message in a messaging environment.

SUMMARY OF THE INVENTION

Methods, systems, and products are disclosed for referencing message elements in an application message in a messaging environment that include: establishing a message model on a computer, the message model specifying a message format for interpreting application messages, the message model comprising one or more message element specifications, each message element specification specifying a message element for storing data in the application messages, each message element specification comprising element characteristics; creating, by a messaging module on the computer in dependence upon the message model, a message element designator map, the message element designator map mapping a separate message element designator to each message element specified by the message model; receiving, in the messaging module from a requesting module, a request for an element designator for a specific message element, the specific message element identified in the request by the element characteristics for the specific message element; and providing, by the messaging module to the requesting module, the requested element designator in dependence upon the message element designator map and the element characteristics for the specific message element.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
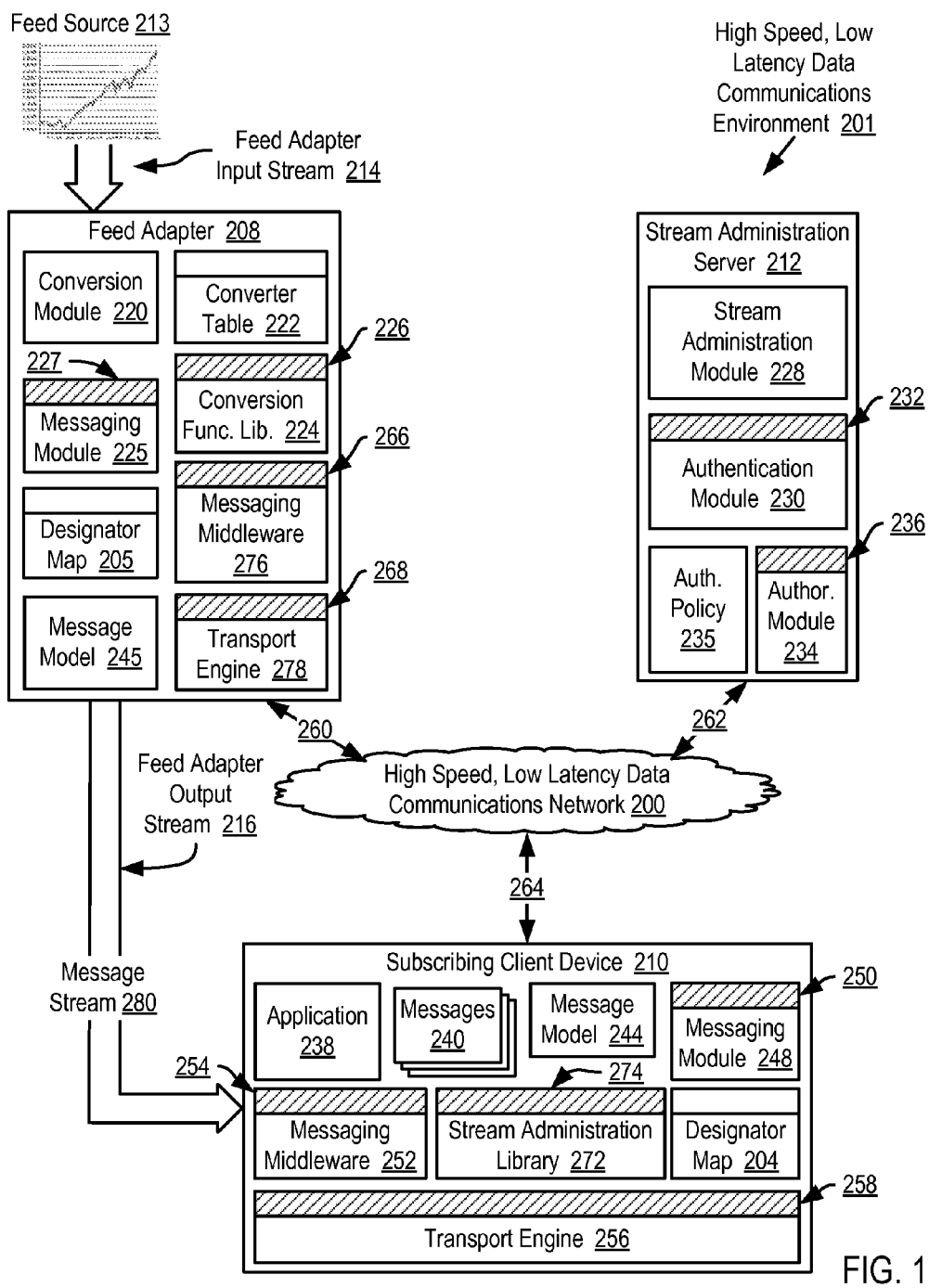
FIG. 1 sets forth a network diagram illustrating an exemplary system for referencing message elements in an application message in a messaging environment according to exemplary embodiments of the present invention.

Exemplary methods, systems, and products for referencing message elements in an application message in a messaging environment according to embodiments of the present invention are described with reference to the accompanying drawings, beginning with FIG. 1. FIG. 1 sets forth a network diagram illustrating an exemplary system for referencing message elements in an application message in a messaging environment according to embodiments of the present invention. The system of FIG. 1 operates generally to referencing message elements in an application message in a messaging environment according to embodiments of the present invention as follows: A message model (244) is established on a computer. The message model (244) specifies a message format for interpreting application messages. The message model (244) includes one or more message element specifications. Each message element specification specifies a message element for storing data in the application messages. Each message element specification includes element characteristics. A messaging module on the computer creates a message element designator map (204) in dependence upon the message model (244). The message element designator map (204) maps a separate message element designator to each message element specified by the message model (244). The messaging module receives a request from a requesting module for an element designator for a specific message element. The specific message element identified in the request by the element characteristics for the specific message element. The messaging module provides the requested element designator to the requesting module in dependence upon the message element designator map (204) and the element characteristics for the specific message element. In the example of FIG. 1, the computer is implemented as either a feed adapter (208) or a subscribing client device (210). In the example of FIG. 1, the requesting module is any software component that requests services from a messaging module (225) installed on the feed adapter (208) or the messaging module (248) installed on the subscribing client device (210).

The high speed, low latency data communications environment (201) illustrated in FIG. 1 includes a high speed, low latency data communications network (200). The network (200) includes a feed adapter (208), a stream administration server (212), and a subscribing client device (210), as well as the infrastructure for connecting such devices (208, 212, 210) together for data communications. The network (200) of FIG. 1 is termed 'high speed, low latency' because the application messages sent between devices connected to the network (200) on message streams administered by the stream administration server (212) bypass the stream administration server (212). For example, the application messages on the message stream (280) from the feed adapter (208) to the subscribing client device (210) bypass the stream administration server (212). Although such messages are not delayed for processing in the stream administration server (212), the stream administration server (212) retains administration of the stream (280) between devices connected to the high speed, low latency data communications network (200).

Further contributing to the 'high speed, low latency' nature of network (200), readers will note that the network (200) does not include a router, that is a computer networking device whose primary function is to forward data packets across a network toward their destinations. Rather, each device (208, 212, 210) provides its own routing functionality for data communication through a direct connection with the other devices connected to the network (200). Because the network (200) does not include a computer networking device dedicated to routing data packets, the network (200) of FIG. 1 may be referred to as a 'minimally routed network.' Although the exemplary network (200) illustrated in FIG. 1 does not include a router, such a minimally routed network is for explanation only. In fact, some high speed, low latency networks useful in referencing message elements in an application message in a messaging environment according to embodiments of the present invention may include a router.

The high speed, low latency data communications environment (201) depicted in FIG. 1 includes a message stream (280). A message stream is a data communication channel between a communications endpoint of a sending device and a communications endpoint of at least one receiving device. A communications endpoint is composed of a network address and a port for a sending device or a receiving device. A message stream may be implemented as a multicast data communication channel. In a multicast data communication channel, a one-to-many relationship exists between a destination address for a message and the communication endpoints of receiving devices. That is, each destination address identifies a set of communication endpoints for receiving devices to which each message of the stream is replicated. A multicast data communication channel may be implemented using, for example, the User Datagram Protocol ('UDP') and the Internet Protocol ('IP'), or the Pragmatic General Multicast ('PGM') protocol. In addition to a multicast data communication channel, the message stream may be implemented as a unicast data communication channel. In a unicast data communication channel, a one-to-one relationship exists between a destination address for a message and a communication endpoint of a receiving device. That is, each destination address uniquely identifies a single communication endpoint of single receiving device. A unicast data communication channel may be implemented using, for example, the Transmission Control Protocol ('TCP') and IP.

The exemplary system of FIG. 1 includes a stream administration server (212) connected to the high speed, low latency data communications network (200) through a wireline connection (262). The stream administration server (212) of FIG. 1 is a computer device having installed upon it a stream administration module (228), an authentication module (230), an authorization module (234), and an authorization policy (235). A stream administration module (228) is a software component that includes a set of computer program instructions configured for brokering establishment of a message stream (280) from the feed adapter (208) to the subscribing client device (210). The message stream (280) of FIG. 1 provides the application messages from the feed adapter (208) to the subscribing client device (210). The stream administration module (228) may broker the establishment of the message stream (280) by receiving a request from the subscribing client device (210) to initialize a message subscription, authenticating the subscribing client device (210), authorizing the subscribing client device (210) to receive application messages (240) from the feed adapter (208) on the message stream (280), and providing to the subscribing client device (210) a data communications endpoint data for the message stream (280) from the feed adapter (208). In addition to brokering the establishment of the message stream (280), the stream administration module (228) also includes a set of computer program instructions for performing other administrative functions in the messaging environment (201) such as, for example, notifying the feed adapter (208) to start publishing messages on the message stream (280) in response to a receiving a publication notification from the subscribing client device (210).

The authentication module (230) of FIG. 1 is a set of computer program instructions capable of providing authentication security services to the stream administration module (228) through an exposed authentication application programming interface ('API') (232). Authentication is a process of verifying the identity of an entity. In the exemplary system of FIG. 1, the authentication module (230) verifies the identity of the subscribing client device (210). The authentication module (230) may provide authentication security services using a variety of security infrastructures such as, for example, shared-secret key infrastructure or a public key infrastructure.

The authorization module (234) of FIG. 1 is a set of computer program instructions capable of providing authorization security services to the stream administration module (228) through an exposed authorization API (236). Authorization is a process of only allowing resources to be used by resource consumers that have been granted authority to use the resources. In the example of FIG. 1, the authorization module (234) identifies the application messages that the subscribing client device (210) is authorized to receive on the message stream (280). The authorization module (234) of FIG. 1 provides authorization security services using an authorization policy (235). The authorization policy (235) is a set of rules governing the privileges of authenticated entities to send or receive application messages on a message stream. In a financial market data environment, for example, an authenticated entity may be authorized to receive application messages that include financial quotes for some financial securities but not other securities. The authorization policy (235) may grant privileges on the basis of an individual entity or an entity's membership in a group.

In the exemplary system of FIG. 1, feed adapter (208) is connected to the high speed, low latency data communications network (200) through a wireline connection (260). The feed adapter (208) is a computer device having the capabilities of converting application messages received on a feed adapter input stream (214) having a first format to application messages having a second format for transmission on a feed adapter output stream (216) to subscribing client devices. The feed adapter input stream (214) is a message stream from a feed source to the feed adapter (208). The feed adapter output stream (216) is a message stream administered by the stream administration server (212) from the feed adapter (208) to the subscribing client device (210).

In the example of FIG. 1, the feed adapter (208) receives application messages on the feed adapter input stream (214) from a feed source (213). The feed source (213) is a computer device capable of aggregating data into application messages and transmitting the messages to a feed adapter. In a financial market data environment, for example, a feed source (213) may be implemented as a feed source controlled by the Options Price Reporting Authority ('OPRA'). OPRA is the securities information processor for financial market information generated by the trading of securities options in the United States. The core information that OPRA disseminates is last sale reports and quotations. Other examples of feed sources in financial market data environment may include feed sources controlled by the Consolidated Tape Association ('CTA') or The Nasdaq Stock Market, Inc. The CTA oversees the dissemination of real-time trade and quote information in New York Stock Exchange and American Stock Exchange listed securities. The Nasdaq Stock Market, Inc. operates the NASDAQ Market Centers$^{SM}$ which is an electronic screen-based equity securities market in the United States. In a financial market data environment, a feed adapter input stream is referred to as a 'financial market data feed.'

The feed adapter (208) of FIG. 1 has installed upon it a conversion module (220), a converter table (222), conversion function library (224), a messaging module (225), a message model (245), messaging middleware (276), and a transport engine (278). The conversion module (220) is a set of computer program instructions for converting application messages received on the feed adapter input stream (214) having a first format into application messages (240) having a second format for transmission to subscribing devices on the feed adapter output stream (216).

The conversion module (220) converts application messages from the first format to the second format according to the converter table (222). The converter table (222) of FIG. 1 is a data structure that specifies the converter functions capable of converting the application message from one format to another format. Utilizing multiple converter tables, the conversion module (220) may convert messages from a variety of input formats to a variety of output formats. In the example of FIG. 1, the converter table (222) specifies the converter functions capable of converting the application message received from the feed adapter input stream (214) having the first format to application messages (240) having the second format for transmission to subscribing client devices on the feed adapter output stream (216). The converter table (222) of FIG. 1 may be implemented using a structured document such as, for example, an eXtensible Markup Language ('XML') document.

The conversion function library (224) of FIG. 1 is a loadable software module that contains one or more converter functions capable of converting data fields in an application message from one format to another format or converting values of data fields from one value to another value. The converter functions contained in the conversion function library may, for example, convert a 16-bit integer to a 32-bit integer, convert a number stored in a string field to a 64-bit double floating point value, increase the value of one data field by one, or any other conversion as will occur to those of skill in the art. The conversion module (220) accesses the converter functions through a set of converter function APIs (226) exposed by the converter functions of the conversion function library (224). In the example of FIG. 1, the conversion function library (224) may be implemented as dynamically linked libraries available to the conversion module (220) at runtime, statically linked libraries linked into the conversion module (220) at compile time, dynamically loaded Java classes, or any other implementation as will occur to those of skill in the art.

In the example of FIG. 1, the application messages (240) transmitted by the feed adapter (208) have a format specified in a message model (245) on the feed adapter (208). The message model (245) is established on the feed adapter (208) and a similar message model is established on the subscribing client device (210) by the stream administration server (212) when the stream administration server (212) brokers a message stream to a subscribing client device. A message model may be implemented using a structured document, such as, for example, an XML document, a Java object, C++ object, or any other implementation as will occur to those of skill in the art.

The message model (245) is metadata that defines the structure and the format used to create, access, and manipulate the application messages (240) converted from the application messages (not shown) received from the feed source (213). That is, the message model (245) specifies a message format for interpreting application messages and includes one or more message element specifications. Each message element specification specifies a message element for storing data in the application messages and includes element characteristics of the message element. A message element is a simple or complex data structure contained in an application message. A simple message element is a data field in an application message such as, for example, a field for storing a person's name or a field for storing a person's age. A complex message element is data structure consisting of two or more data fields. For example, a complex message element may be implemented as an address data structure whose constituent data fields consist of a street field, a city field, a state field, and a zip code field. In such an example, the complex message element consisted of simple message elements, but readers will note that complex message elements may also consist of other complex message elements. For example, a complex message element representing information about a person may include the exemplary complex message element above representing a person's address.

In the example of FIG. 1, the conversion module (220) and the converter functions of the conversion function library (224) process the data contained in the application messages (240) using the messaging module (225). The messaging module (225) is a software module that includes a set of functions for creating, accessing, and manipulating messages (240) according to a message model (245). The messaging module (225) is accessible to the conversion module (220), the converter functions of the conversion function library (224), and the messaging middleware (276) through a message API (227) exposed by the messaging module (225).

The messaging module (225) of FIG. 1 includes a set of computer program instructions for referencing message elements in an application message in a messaging environment according to embodiments of the present invention. The messaging module (225) operates generally for referencing message elements in an application message in a messaging environment according to embodiments of the present invention by creating, on the computer in dependence upon the message model (245), a message element designator map (205), the message element designator map (205) mapping a separate message element designator to each message element specified by the message model (245), receiving a request for an element designator for a specific message element from a requesting module, the specific message element identified in the request by the element characteristics for the specific message element, and providing the requested element designator to the requesting module in dependence upon the message element designator map (205) and the element characteristics for the specific message element. The requesting module is a software component such as, for example, the conversion module (220), the converter functions of the conversion function library (224), and the messaging middleware (276) that request message access services from the messaging module (225).

In the exemplary system of FIG. 1, the feed adapter (208) has created upon it a message element designator map (205). The message element designator map (205) of FIG. 1 is a data structure that maps a separate message element designator to each message element specified by the message model (245). The message element designator map (205) of FIG. 1 maps a message element designator to a message element specified by the message model (245) by mapping a message element designator to the element characteristics specified in the message model (245) for a particular message element. A message element designator is a unique identifier used to reference a message element in an application message or metadata describing the message element. The messaging module (225) uses the message element designator to directly retrieve the specification data for a particular message element from the map (205) without searching through the message model (245). The ability to directly retrieve specification data such as, for example, format type, offset, size, and other characteristics for a message element advantageously allows the messaging module (225) to process application message access requests from requesting modules using less computer resources than sequentially searching through the message model (245) for the specification data. As such, the message module (225) creates the message element designator map (205) when the feed adapter (208) initializes and uses the message element designator map (205) during runtime instead of the message model (245). In the example of FIG. 1, the message element designator map (205) may be implemented as a table, a Java object, a C++ object, a set of arrays, or any other implementation as will occur to those of skill in the art. The message element designator may be implemented as an index number into the map (205), a pointer to a computer memory location storing a portion of the map (205), or any other implementation as will occur to those of skill in the art.

Before the conversion module (220) of FIG. 1 performs data processing on the application messages, the conversion module (220) receives application messages (not shown) having a first format from the feed source (213). The conversion module (220) of FIG. 1 may receive the source stream messages through a receiving transport engine (not shown) of the feed adapter (208). The receiving transport engine is a software module that operates in the transport layer of the network stack and may be implemented according to the TCP/IP protocols, UDP/IP protocols, the PGM protocol, or any other data communication protocol as will occur to those of skill in the art. The receiving transport engine may provide the received application messages directly to the conversion module (220) or to the messaging middleware (276), which in turn, provides the source stream messages to the conversion module (220).

After the conversion module (220) of FIG. 1 performs data processing on the application messages received from the feed source (213), the conversion module (220) provides the application messages having the second format to the messaging middleware (276). The messaging middleware (276) of FIG. 1 is a software component that provides high availability services between the feed adapter (208), any backup feed adapter that may exist, the subscribing client device (210), and the feed source (213). In addition to providing high availability services, the messaging middleware (276) of FIG. 1 may also provide administration services for the application messages such as, for example, inserting sequence numbers into the messages, calculating proxies for the contents of the application messages used in filtering the messages, ensuring application messages are transmitted on the proper message stream, and providing the application messages to a transport engine. The application messages provided to the transport engine (278) are received from the conversion module (220). The conversion module (220) interacts with the messaging middleware (276) through a messaging middleware API (266) exposed by the messaging middleware (276).

The transport engine (278) of FIG. 1 is a software component operating in the transport and network layers of the OSI protocol stack promulgated by the International Organization for Standardization. The transport engine (278) provides data communications services between network-connected devices. The transport engine may be implemented according to the TCP/IP protocols, UDP/IP protocols, PGM protocol, or any other data communications protocols as will occur to those of skill in the art. The transport engine (278) is a software module that includes a set of computer program instructions for transmitting application messages to the subscribing client device (210). The transport engine (278) of FIG. 1 may transmit the application messages (240) by receiving the application messages from the messaging middleware (276), encapsulating the application messages provided by the messaging middleware (276) into transport packets, and transmitting the packets through the message stream (280) to the subscribing client device (210). The messaging middleware (276) operates the transport engine (278) through a transport API (268) exposed by the transport engine (278).

The subscribing client device (210) in exemplary system of FIG. 1 connects to the high speed, low latency data communications network (200) through a wireline connection (264). The subscribing client device (210) of FIG. 1 is a computer device capable of subscribing to the message streams transmitted by various feed adapters. In a financial market data environment, for example, a subscribing client device may subscribe to a tick to receive the bid and ask prices for a particular security on a message stream provided by a feed adapter controlled by a financial securities broker.

In the example of FIG. 1, the subscribing client device (210) has installed upon it an application (238), a messaging module (248), messaging middleware (252), a stream administration library (272), and a transport engine (256). The subscribing client device (210) also has created upon it a message element designator map (204) and a message model (244) that is similar to the message element designator map (205) and the message model (245) created on the feed adapter (208). The application (238) is a software component that processes data contained in the application messages (240) received from the feed adapter (208). The application (238) may process the data for utilization by the subscribing client device (210) itself, for contributing the data to another feed adapter, or for contributing the data to some other device. In a financial market data environment, the application installed on the subscribing client device may be a program trading application that buys or sells financial securities based on the quoted prices contained in ticks. The application may also be a value-adding application that contributes information to a tick such as, for example, the best bid and ask prices for a particular security, that is not typically included in the ticks provided by the feed source (213). The subscribing client device may then transmit the ticks to a feed adapter for resale to other subscribing client devices.

The application (238) processes the data contained in the application messages (240) using the messaging module (248). The messaging module (248) is software module that includes a set of functions for creating, accessing, and manipulating messages (240) according to the message model (245) that is installed on the subscribing client device (210). The messaging module (248) is accessible to the application (238) through a message API (250) exposed by the messaging module (248).

The messaging module (248) of FIG. 1 includes a set of computer program instructions for referencing message elements in an application message in a messaging environment according to embodiments of the present invention. The messaging module (248) operates generally for referencing message elements in an application message in a messaging environment according to embodiments of the present invention by creating, on the computer in dependence upon the message model (244), a message element designator map (204), the message element designator map (204) mapping a separate message element designator to each message element specified by the message model (244), receiving a request for an element designator for a specific message element from a requesting module, the specific message element identified in the request by the element characteristics for the specific message element, and providing the requested element designator to the requesting module in dependence upon the message element designator map (204) and the element characteristics for the specific message element. The requesting module is a software component such as, for example, the application (238), the stream administration library (272), and the messaging middleware (252) that request message access services from the messaging module (248).

The communications between the subscribing client device (210) and the stream administration server (212) may be implemented using a stream administration library (272). The stream administration library (272) is a set of functions contained in dynamically linked libraries or statically linked libraries available to the application (238) through a stream administration library API (274). Through the stream administration library (272), the subscribing client device (210) of FIG. 1 may request to subscribe to messages from a feed adapter, modify an existing message subscription, or cancel a subscription. Functions of the stream administration library (272) used by the application (238) may communicate with the stream administration server (212) through network (200) by calling member methods of a CORBA object, calling member methods of remote objects using the Java Remote Method Invocation ('RMI') API, using web services, or any other communication implementation as will occur to those of skill in the art.

'CORBA' refers to the Common Object Request Broker Architecture, a computer industry specifications for interoperable enterprise applications produced by the Object Management Group ('OMG'). CORBA is a standard for remote procedure invocation first published by the OMG in 1991. CORBA can be considered a kind of object-oriented way of making remote procedure calls, although CORBA supports features that do not exist in conventional RPC. CORBA uses a declarative language, the Interface Definition Language ("IDL"), to describe an object's interface. Interface descriptions in IDL are compiled to generate 'stubs' for the client side and 'skeletons' on the server side. Using this generated code, remote method invocations effected in object-oriented programming languages, such as C++ or Java, look like invocations of local member methods in local objects.

The Java™ Remote Method Invocation API is a Java application programming interface for performing remote procedural calls published by Sun Microsystems™. The Java™ RMI API is an object-oriented way of making remote procedure calls between Java objects existing in separate Java™ Virtual Machines that typically run on separate computers. The Java™ RMI API uses a remote procedure object interface to describe remote objects that reside on the server. Remote procedure object interfaces are published in an RMI registry where Java clients can obtain a reference to the remote interface of a remote Java object. Using compiled 'stubs' for the client side and 'skeletons' on the server side to provide the network connection operations, the Java™ RMI allows a Java client to access a remote Java object just like any other local Java object.

Before the application (238) processes the data contained in the application messages (240), the application (238) receives the messages (240) from the messaging middleware (252), which, in turn, receives the application messages (240) from the feed adapter (208) through the transport engine (256). The messaging middleware (252) is a software component that provides high availability services between the subscribing client device (210), the feed adapter (208), any backup feed adapters, and the stream administration module (212). The application (238) and the stream administration library (272) interact with the messaging middleware (252) through a messaging middleware API (254).

The transport engine (256) of FIG. 1 is a software component operating in the transport and network layers of the OSI protocol stack promulgated by the International Organization for Standardization. The transport engine (256) provides data communications services between network-connected devices. The transport engine may be implemented according to the TCP/IP protocols, UDP/IP protocols, PGM protocol, or any other data communications protocols as will occur to those of skill in the art. The transport engine (256) is a software component for receiving application messages (240) from the feed adapter (208). The transport engine (256) receives the application messages (240) by receiving transport packets through the message stream (280) from the feed adapter (208), unencapsulating the application messages (240) from the received packets, and provides the application messages (240) to messaging middleware (252) of the subscribing client device (210). In the example of FIG. 1, the messaging middleware (252) operates the transport engine (256) through a transport API (258) exposed by the transport engine (256).

The servers and other devices illustrated in the exemplary system of FIG. 1 are for explanation, not for limitation. Devices useful in referencing message elements in an application message in a messaging environment may be implemented using general-purpose computers, such as, for example, computer servers or workstations, hand-held computer devices, such as, for example, Personal Digital Assistants ('PDAs') or mobile phones, or any other automated computing machinery configured for data processing according to embodiments of the present invention as will occur to those of skill in the art.

The arrangement of servers and other devices making up the exemplary system illustrated in FIG. 1 are for explanation, not for limitation. Although the connections to the network (200) of FIG. 1 are depicted and described in terms of wireline connections, readers will note that wireless connections may also be useful according to various embodiments of the present invention. Furthermore, data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example Transmission Control Protocol ('TCP'), Internet Protocol ('IP'), HyperText Transfer Protocol ('HTTP'), Wireless Access Protocol ('WAP'), Handheld Device Transport Protocol ('HDTP'), and others as will occur to those of skill in the art. Various embodiments of the present invention may be implemented on a variety of hardware platforms in addition to those illustrated in FIG. 1.

Referencing message elements in an application message in a messaging environment in accordance with the present invention in some embodiments may be implemented with one or more subscribing client devices, stream administration servers, and feed adapters. These devices and servers are, in turn, implemented to some extent at least as computers, that is, automated computing machinery. For further explanation, therefore, FIG. 2 sets forth a block diagram of automated computing machinery comprising an exemplary subscribing client device (210) useful in referencing message elements in an application message in a messaging environment according to embodiments of the present invention. The subscribing client device (210) of FIG. 2 includes at least one computer processor (156) or 'CPU' as well as random access memory (168) ('RAM') which is connected through a high speed memory bus (166) and bus adapter (158) to processor (156) and to other components of the subscribing client device.

Figure 2:
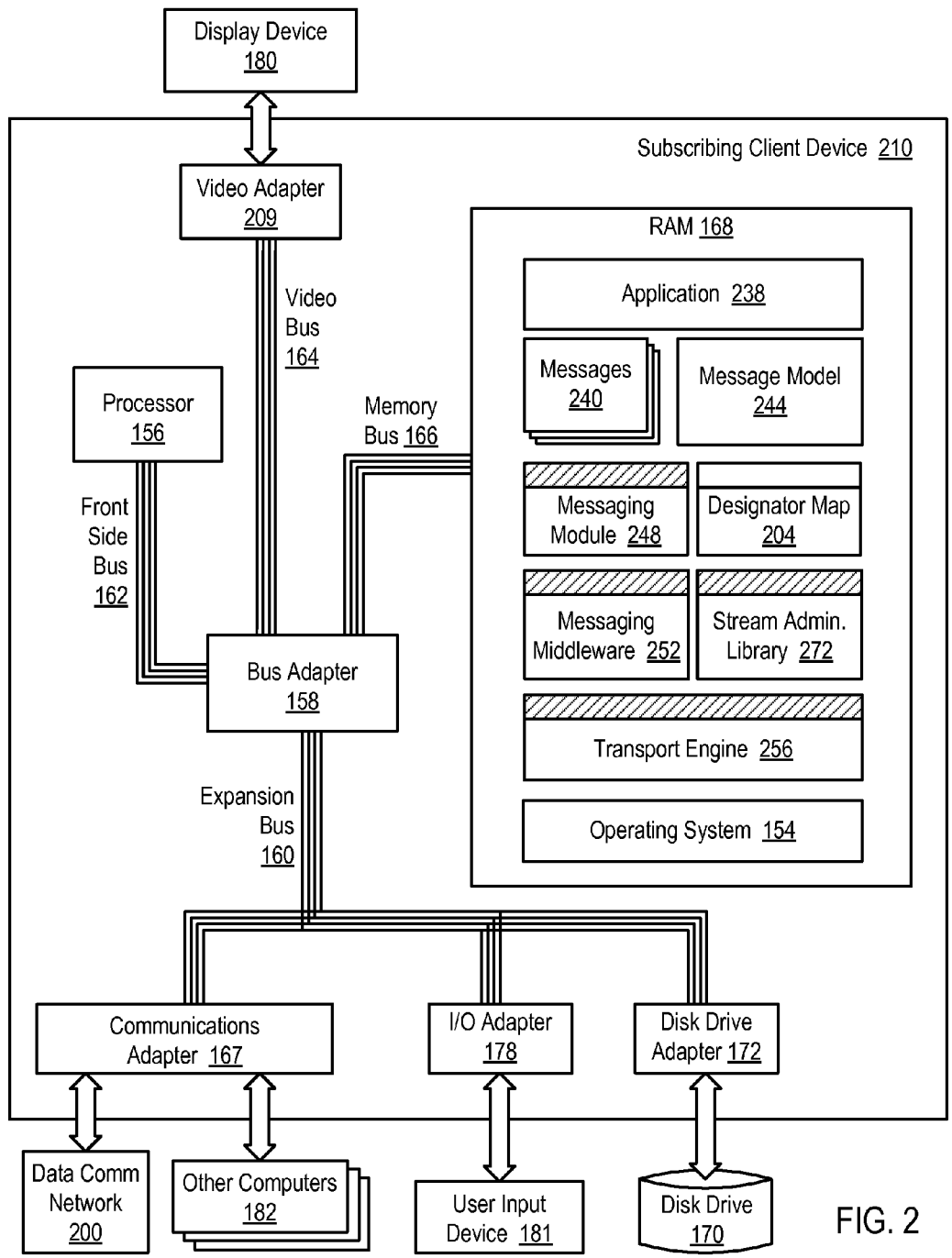
FIG. 2 sets forth a block diagram of automated computing machinery comprising an exemplary subscribing client device useful in referencing message elements in an application message in a messaging environment according to exemplary embodiments of the present invention.

Stored in RAM (168) are an application (238), messages (240), message model (244), a messaging module (248), a message element designator map (204), a messaging middleware (252), a stream administration library (272), and a transport engine (256). Each message (240) is a quantity of data that includes one or more data fields and is transmitted from one device to another on a message stream. As mentioned above, a message may represent numeric or textual information, images, encrypted information, computer program instructions, and so on. In a financial market data environment, for example, a message is commonly referred to as a 'tick' and represents financial market data such as, for example, financial quotes or financial news. Each message (240) may be implemented using a structured document such as, for example, an XML document, a Java object, C++ object, or any other implementation as will occur to those of skill in the art. The message model (244) is metadata that defines the structure and format of the messages (240). The message model (244) may also be implemented using a structured document such as, for example, an XML document, a Java object, C++ object, or any other implementation as will occur to those of skill in the art. The message element designator map (204) of FIG. 2 is a data structure that maps a separate message element designator for each message element specified by the message model (244). In the example of FIG. 2, the message element designator map (204) may be implemented as a table, a Java object, a C++ object, a set of arrays, or any other implementation as will occur to those of skill in the art. The application (238), the messaging module (248), the messaging middleware (252), the stream administration library (272), and the transport engine (256) illustrated in FIG. 2 are software components, that is computer program instructions, that operate as described above with reference to FIG. 1.

Also stored in RAM (168) is an operating system (154). Operating systems useful in subscribing client devices according to embodiments of the present invention include UNIX™, Linux™, Microsoft NT™, IBM's AIX™, IBM's i5/OS™, and others as will occur to those of skill in the art. The operating system (154), the application (238), the messages (240), the message model (244), the messaging module (248), the message element designator map (204), the messaging middleware (252), and the transport engine (256) in the example of FIG. 2 are shown in RAM (168), but many components of such software typically are stored in non-volatile memory also, for example, on a disk drive (170).

The exemplary subscribing client device (210) of FIG. 2 includes bus adapter (158), a computer hardware component that contains drive electronics for high speed buses, the front side bus (162), the video bus (164), and the memory bus (166), as well as drive electronics for the slower expansion bus (160). Examples of bus adapters useful in subscribing client devices useful according to embodiments of the present invention include the Intel Northbridge, the Intel Memory Controller Hub, the Intel Southbridge, and the Intel I/O Controller Hub. Examples of expansion buses useful in subscribing client devices useful according to embodiments of the present invention may include Peripheral Component Interconnect ('PCI') buses and PCI Express ('PCIe') buses.

The exemplary subscribing client device (210) of FIG. 2 also includes disk drive adapter (172) coupled through expansion bus (160) and bus adapter (158) to processor (156) and other components of the exemplary subscribing client device (210). Disk drive adapter (172) connects non-volatile data storage to the exemplary subscribing client device (210) in the form of disk drive (170). Disk drive adapters useful in subscribing client devices include Integrated Drive Electronics ('IDE') adapters, Small Computer System Interface ('SCSI') adapters, and others as will occur to those of skill in the art. In addition, non-volatile computer memory may be implemented for a subscribing client device as an optical disk drive, electrically erasable programmable read-only memory (so-called 'EEPROM' or 'Flash' memory), RAM drives, and so on, as will occur to those of skill in the art.

The exemplary subscribing client device (210) of FIG. 2 includes one or more input/output ('I/O') adapters (178). I/O adapters in subscribing client devices implement user-oriented input/output through, for example, software drivers and computer hardware for controlling output to display devices such as computer display screens, as well as user input from user input devices (181) such as keyboards and mice. The exemplary subscribing client device (210) of FIG. 2 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary subscribing client device (210) of FIG. 2 includes a communications adapter (167) for data communications with other computers (182) and for data communications with a high speed, low latency data communications network (200). Such data communications may be carried out through Ethernet™ connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for referencing message elements in an application message in a messaging environment according to embodiments of the present invention include modems for wired dial-up communications, IEEE 802.3 Ethernet adapters for wired data communications network communications, and IEEE 802.11b adapters for wireless data communications network communications.

Although FIG. 2 is discussed with reference to exemplary subscribing client devices, readers will note that automated computing machinery used to implement exemplary stream administration servers and exemplary feed adapters useful in referencing message elements in an application message in a messaging environment according to embodiments of the present invention are similar to the exemplary subscribing client device (210) of FIG. 2. That is, such exemplary stream administration servers and feed adapters include one or more processors, bus adapters, buses, RAM, video adapters, communications adapters, I/O adapters, disk drive adapters, and other components similar to the exemplary subscribing client device (210) of FIG. 2 as will occur to those of skill in the art.

Figure 3:
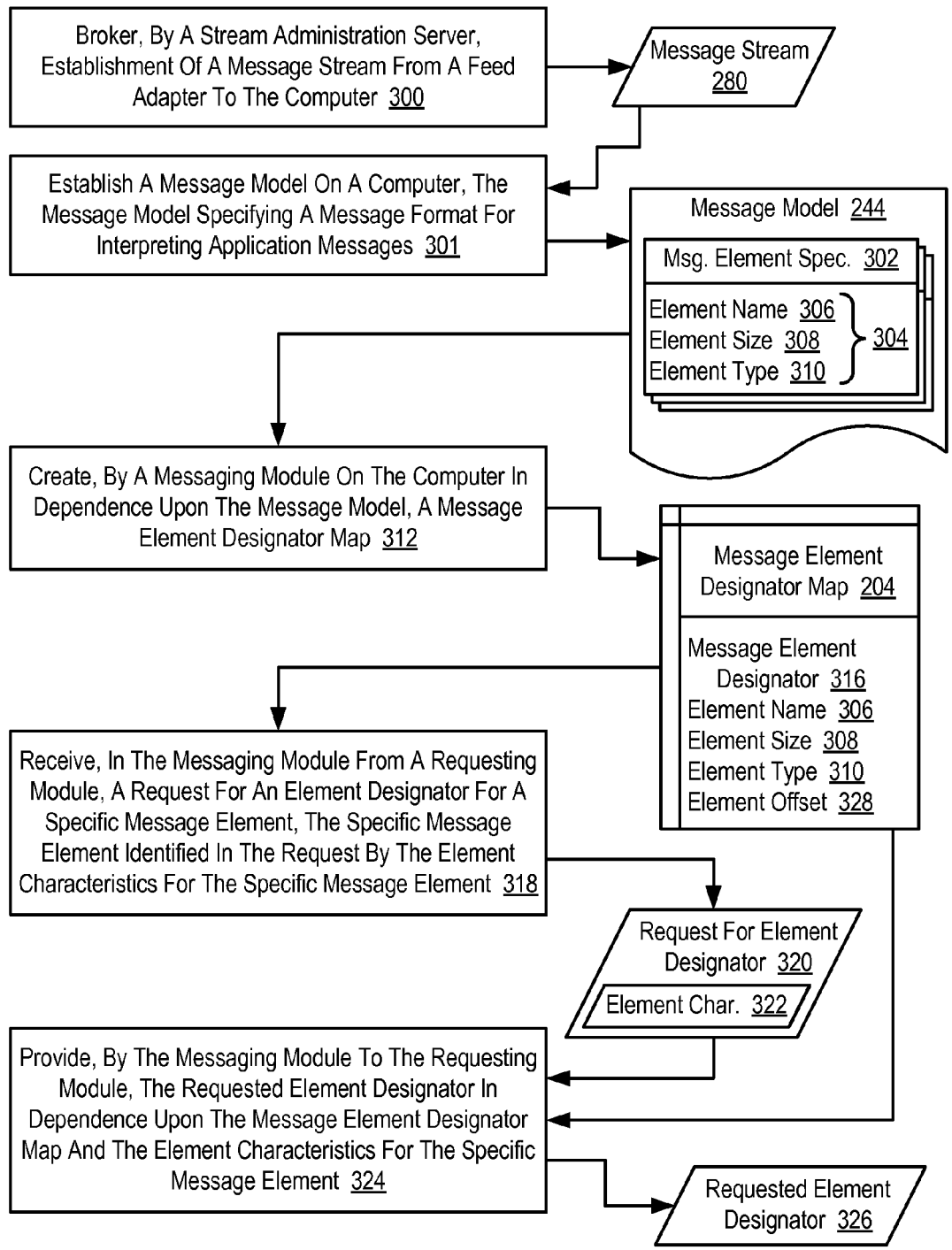
FIG. 3 sets forth a flowchart illustrating an exemplary method of referencing message elements in an application message in a messaging environment according to exemplary embodiments of the present invention.

For further explanation, FIG. 3 sets forth a flowchart illustrating an exemplary method of referencing message elements in an application message in a messaging environment according to embodiments of the present invention. The method of FIG. 3 includes brokering (300), by a stream administration server, establishment of a message stream (280) from a feed adapter to a computer such as, for example, a client subscribing device. The message stream (280) provides the application messages from the feed adapter to the computer. The message stream (280) represents a data communication channel between a communications endpoint of a feed adapter and a communications endpoint of the computer. A message stream may be implemented as a multicast data communication channel using the UDP/IP protocols or a unicast data communication channel using TCP/IP protocols as discussed above with reference to FIG. 1.

Brokering (300), by a stream administration server, establishment of a message stream (280) from a feed adapter to a computer according to the method of FIG. 3 may be carried out by receiving a subscription request from a requesting module on the computer to subscribe to messages from a feed adapter. The subscription request may be implemented as an XML document, a call to a member method of a RMI object on the computer, or any other implementation as will occur to those of skill in the art. The subscription request may include topics of the messages that the requesting module requests to receive from the feed adapter. A topic represents the characteristics of the messages that the requesting module requests. Using a topic, a requesting module may specify the group of messages for receipt from the feed adapter. In a financial market data environment, for example, a requesting module on a computer such as, for example, a client subscribing device may use a topic to request ticks from an OPRA feed source that contains quotes of an IBM option traded on the Chicago Board Options Exchange ('CBOE') that includes the best bid and best ask for the IBM option on the CBOE.

In the example of FIG. 3, brokering (300), by a stream administration server, establishment of a message stream (280) from the feed adapter to the computer may include providing the message receiving device with a destination address for the feed adapter. The destination address for the feed adapter is a multicast address or a unicast address used by the requesting module on the computer to listen for messages from a feed adapter. Using the destination address provided by the stream administration server, the requesting module may establish the message stream (280) from the feed adapter to the computer.

Before the stream administration server provides the destination address for the feed adapter, the stream administration server in the example of FIG. 3 may perform several security services to ensure that the requesting module on the computer only receives messages from the feed adapter for which the computer is authorized to receive. In the method of FIG. 3, brokering (300), by a stream administration server, establishment of a message stream (280) from the feed adapter to the computer may also be carried out by authenticating the requesting module on the computer and authorizing the requesting module to receive messages from the feed adapter on the message stream (280). Authenticating the requesting module may be carried out by verifying client security credentials provided by the requesting module with the subscription request. The client security credentials may be implemented as a digital signature in a public key infrastructure, a security token, or any other security data as will occur to those of skill in the art for authenticating the identity of the originator of the subscription request. Authorizing the requesting module to receive messages from the feed adapter on the message stream (280) may be carried out by identifying the privileges associated with the authenticated requesting module in dependence upon an authorization policy. An authorization policy is a set of rules governing the privileges of authenticated requesting module requesting to receive data from a feed adapter.

The method of FIG. 3 also includes establishing (301) a message model (244) on the computer. The message model (244) is metadata that defines the structure and the format used to create, access, and manipulate application messages on the computer. That is, the message model (244) specifies a message format for interpreting application messages. The message model (244) of FIG. 3 includes one or more message element specifications (302). Each message element specification (302) is metadata that specifies a message element for storing data in an application message. Each message element specification (302) of FIG. 3 includes element characteristics (304). The element characteristics (304) describe the attributes of the message elements in an application message. In the example of FIG. 3, the element characteristics (304) of each message element specification (302) include an element name (306), an element size (308), and an element type (310). The element name (306) specifies a description for each message element specified by the message element specifications (302). The element size (308) specifies the size of each message element specified by the message element specifications (302). The element type (310) specifies the type of each message element specified by the message element specifications (302). Typically, the message model (244) of FIG. 3 is established on the computer by the stream administration server when the stream administration server brokers the message stream (280).

As mentioned above, the message model (244) of FIG. 3 may be implemented using a structured document such as, for example, an eXtensible Markup Language ('XML') document. For further explanation, consider an exemplary message model useful in referencing message elements in an application message in a messaging environment according to embodiments of the present invention. Such an exemplary message model may be implemented in XML as follows:

```
1:   <message_model>
2:     <element_spec>
3:       name="Name"
4:       type=string
5:       size=20
6:     </element_spec>
7:     <element_spec>
8:       name="Age"
9:       type=integer
10:      size=1
11:    </element_spec>
12:    <element_spec>
13:      name="Address"
14:      type=structure
15:      <element_spec>
16:        name="Street"
17:        type=string
18:        size=20
19:      </element_spec>
20:      <element_spec>
21:        name="City"
22:        type=string
23:        size=20
24:      </element_spec>
25:      <element_spec>
26:        name="State"
27:        type=string
28:        size=2
29:      </element_spec>
30:      <element_spec>
31:        name="Zip"
32:        type=string
33:        size=5
34:      </element_spec>
35:    </element_spec>
36:  </message_model>
```

In the example above, lines 1 and 37 contain markup tags that denote the beginning and the end, respectively, of the exemplary message model. Lines 2 through 6 implement a message element specification for a message element for storing a person's name in an application message. Lines 7 through 11 implement a message element specification for a message element for storing a person's age in an application message. Lines 12 through 35 implement a message element specification for a message element for storing a person's address in an application message. The address message element specification implemented in lines 12 through 35 includes four message element specifications nested inside the address message element specification. Lines 15 through 19 implement a message element specification for a message element for storing a person's street of residence in an application message. Lines 20 through 24 implement a message element specification for a message element for storing a person's city of residence in an application message. Lines 25 through 29 implement a message element specification for a message element for storing a person's state of residence in an application message. Lines 30 through 34 implement a message element specification for a message element for storing a person's zip code in an application message. Readers will note that the exemplary message model above is for explanation and not for limitation. Other message models as will occur to those of skill in the art may also be useful in referencing message elements in an application message in a messaging environment according to embodiments of the present invention. Readers will also note that the XML implementation, the markup tags, and structure of the exemplary message model above is also for explanation and not for limitation. Many other implementations, markup tags, or structures may be used to implement message models useful according to embodiments of the present invention.

The method of FIG. 3 includes creating (312), by a messaging module on the computer in dependence upon the message model (244), a message element designator map (204). The message element designator map (204) of FIG. 1 is a data structure that maps a separate message element designator (316) to each message element specified by the message model (244). A message element designator is a unique identifier used to reference a message element in an application message or metadata describing the message element. The message element designator map (204) of FIG. 1 maps a message element designator (316) to a message element specified by the message model (244) by mapping a message element designator (316) to the element characteristics (304) specified in the message model (244) for the particular message element. In addition to the characteristics (304) specified in the message model (244), the message element designator map (204) may also include other characteristics such as, for example, an offset position from the beginning of an application message that the messaging module calculates using the characteristics (304) specified in the message model (244).

The message element designator map (204) in the example of FIG. 3 is implemented as table. Readers will note, however, that other implementations such as, for example, a Java object or C++ object are also within the scope of the present invention. Each record in the message element designator map (204) of FIG. 3 represents a message element specified in the message model (244) for storing data in application messages. In the example of FIG. 3, each record of the map (204) includes a message element designator (316), the element name (306), the size (308), the element type (310), and an element offset (328). The element name (306), the size (308), and the element type (310) are the element characteristics (304) from the message model (244) as discussed above. The element offset (328) of FIG. 3 represents the element's offset position from the beginning of an application message and, as mentioned above, is calculated from the characteristics (304) specified in the message model (244). The message element designator (316) of FIG. 3 represents a unique identifier used to reference a message element in an application message or metadata describing the message element. The message element designator (316) may be implemented as an index for each record in the message element designator map (204) or as a pointer to each record in the message element designator map (204). For further explanation, consider the following exemplary message element designator map created from the exemplary message model described above:

Exemplary Message Element Designator Map

| Message Element Designator | Element Name | Element Size | Element Type | Element Offset |
|---|---|---|---|---|
| 1 | Name | 20 | string | 0 |
| 2 | Age | 1 | integer | 20 |
| 3 | Address | 47 | structure | 21 |
| 4 | Street | 20 | string | 68 |
| 5 | City | 20 | string | 88 |
| 6 | State | 2 | string | 108 |
| 7 | Zip | 5 | string | 110 |

The exemplary message element designator map above includes seven records, one record for each message element specified by the exemplary message model above. The exemplary message element designator map above maps a separate message element designator to each message element specified by the exemplary message model above that may be used to reference the specified message element. Readers will note that the exemplary message element designator map above is for explanation and not for limitation. Other message element designator maps as will occur to those of skill in the art may also be useful in referencing message elements in an application message in a messaging environment according to embodiments of the present invention. Readers will also note that the table implementation and the table structure of the exemplary message element designator map above are also for explanation and not for limitation. Many other implementations or structures may also be used to implement message element designator maps useful according to embodiments of the present invention.

Readers will appreciate the advantage of referencing message elements using a message element designator when considering referencing the message elements using one of the element characteristics specified in the model. Referencing a message element using one of the characteristics specified in the message model requires the messaging module to search the message model, often sequentially, for the particular element characteristic, such as, for example, the element name, used to reference a message element. Searching the message model typically involves string operations that consume excessive amounts of computer resources and are slower compared to other numeric operations. When the message element designator is used to reference a message element, the message module may quickly locate element characteristics pertaining to the message element in a message element designator map using fast numeric operators with the index numbers or pointers implementing the message element designator.

The messaging module may create (312) a message element designator map (204) according to the method of FIG. 3 by parsing the message model (244) for each message element specification, retrieving the element characteristics from each message element specification, and inserting the element characteristics into the message element designator map (204). When the messaging module inserts the element characteristics into the message element designator map (204), the messaging module may explicitly associate a message element designator (316) with the element characteristics such as, for example, associating an index number implementing the message element designator (316) with the element characteristics. The messaging module may, however, implicitly specify a message element designator (316) with the element characteristics using the structure of the map (204) such as, for example, when the message element designator (316) is implemented as a pointer to the record containing the element characteristics in a table implementing the map (204). The messaging module typically creates (312) the message element designator map (204) when the computer initializes or when the computer receives a new message model. Creating the map (204) at startup or upon receiving a new message model advantageously allows the messaging module to only search through the entire message model (244) once instead of each time the messaging module references message elements in application messages.

As mentioned above, the message element designator map (204) is typically created when the computer initializes on startup. Readers will also note that the message element designators are not typically mapped to message elements until the message element designator map (204) is created. A requesting module that requests services from the messaging module, therefore, must query the messaging module for the message element designator for a particular message element before the requesting module gains the benefits of referencing the message element using the message element designator according to embodiments of the present invention.

The method of FIG. 3 includes receiving (318), in the messaging module from a requesting module, a request (320) for an element designator (326) for a specific message element. The specific message element is identified in the request (320) by the element characteristics (322) for the specific message element. The request (320) for the element designator (326) for the specific message element may be implemented as an XML document, a call to a function of an API for the requesting module, or any other implementation as will occur to those of skill in the art. For example, consider the following exemplary function in the API of the requesting module useful for receiving a request for an element designator for a specific message element according to embodiments of the present invention:

designator request_designator(string name);

A requesting device may call the exemplary function 'request_designator' above to request an element designator for the message element identified by the element characteristic whose value matches the value for 'name.' The exemplary function 'request_designator' returns the message element designator after executing the function. Readers will note that the exemplary function described above is for explanation and not for limitation. In fact, other exemplary functions as will occur to those of skill in the art may also be useful in referencing message elements in an application message in a messaging environment according to embodiments of the present invention.

The method of FIG. 3 also includes providing (324), by the messaging module to the requesting module, the requested element designator (326) in dependence upon the message element designator map (204) and the element characteristics (322) for the specific message element. The requested element designator (326) represents the message element designator mapped to the message element identified by the element characteristics (322). The messaging module may provide (324) the requested element designator (326) according to the method of FIG. 3 by identifying in the map (204) the message element designator for the message element having values for element characteristics that match the values for the element characteristics (322) and transmitting the identified element designator to the requesting module. The messaging module may transmit the identified element designator to the requesting module by transmitting the requested element designator (326) to the requesting module as a return value from a function called by the requesting module as in the exemplary 'request_designator' function above, sending the requested element designator (326) to the requesting module in an XML message using web services, or any other implementation as will occur to those of skill in the art.

After the requesting module has the message element designator for a specific message element, the requesting module may then reference the specific message element using the message element designator. Using the message element designator, the requesting module may request a value for a message element in an application message. For further explanation, therefore, FIG. 4 sets forth a flowchart illustrating a further exemplary method of referencing message elements in an application message in a messaging environment according to embodiments of the present invention that includes receiving (402), by the messaging module from the requesting module, a request (404) for a value (408) for the specific message element in an application message (400).

Figure 4:
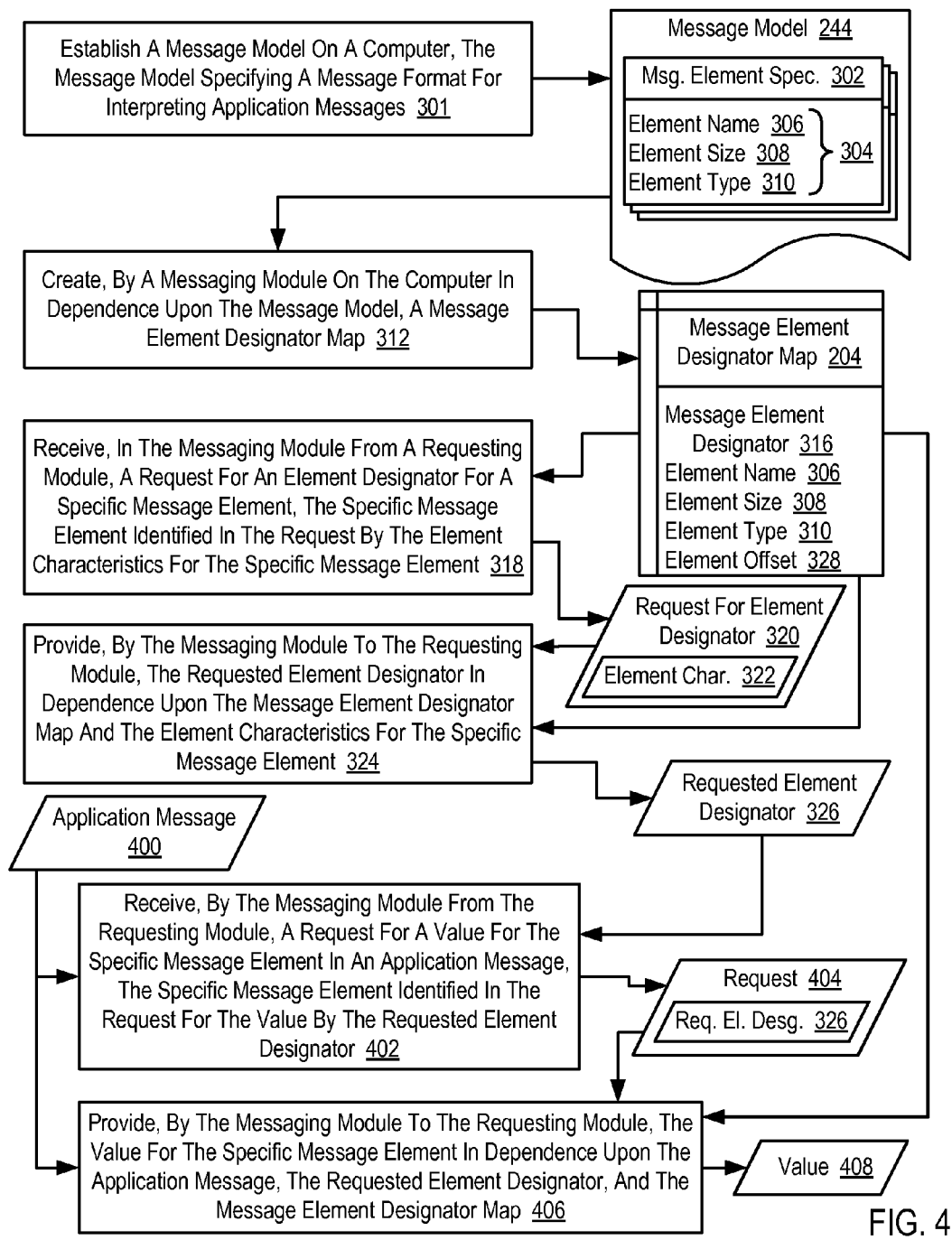
FIG. 4 sets forth a flowchart illustrating a further exemplary method of referencing message elements in an application message in a messaging environment according to exemplary embodiments of the present invention.

The method of FIG. 4 is similar to the method of FIG. 3. That is, the method of FIG. 4 includes establishing (301) a message model (244) on a computer. The message model (244) specifies a message format for interpreting application messages and includes one or more message element specifications (302). Each message element specification (302) of FIG. 4 specifies a message element for storing data in the application messages Each message element specification (302) includes element characteristics (304) consisting of an element name (306), an element size (308), and an element type (310). The method of FIG. 4 is similar to the method of FIG. 3 in that the method of FIG. 4 also includes: creating (312), by a messaging module on the computer in dependence upon the message model (244), a message element designator map (204), the message element designator map (204) mapping a separate message element designator (316) to each message element specified by the message model (244); receiving (318), in the messaging module from a requesting module, a request (320) for an element designator (326) for a specific message element, the specific message element identified in the request by the element characteristics (322) for the specific message element; and providing (324), by the messaging module to the requesting module, the requested element designator (326) in dependence upon the message element designator map (204) and the element characteristics (322) for the specific message element. The message element designator map (204) of FIG. 4 includes a message element designator (316), the element name (306), the element size (308), the element type (310), and the element offset (328).

The method of FIG. 4 also includes receiving (402), by the messaging module from the requesting module, a request (404) for a value (408) for the specific message element in an application message (400). The specific message element is identified in the request (404) for the value by the requested element designator (326). The request (404) for the value (408) for the specific message element in the application message (404) may be implemented as an XML document, a call to a function of an API for the requesting module, or any other implementation as will occur to those of skill in the art. For example, consider the following exemplary function in the API of the requesting module useful for receiving a request for a value for the specific message element in an application message according to embodiments of the present invention:

value request_value(message*msg, designator dsg);

A requesting device may call the exemplary function 'request_value' above to request a value from the application message located at computer memory address identified by the value of 'msg.' The particular element for which the value is requested is identified by the message element designator having a value that matches the value for 'dsg.' The exemplary function 'request_value' returns the value for the message element in the application message after executing the function. Readers will note that the exemplary function described above is for explanation and not for limitation. In fact, other exemplary functions as will occur to those of skill in the art may also be useful in referencing message elements in an application message in a messaging environment according to embodiments of the present invention.

The method of FIG. 4 also includes providing (406), by the messaging module to the requesting module, the value (408) for the specific message element in dependence upon the application message (400), the requested element designator (326), and the message element designator map (204). The messaging module may provide (406) the value (408) for the specific message element according to the method of FIG. 4 by identifying in the map (204) the value for the element offset (328) associated with the value for the message element designator (316) that matches the value for the requested element designator (326). The messaging module may then provide (406) the value (408) for the specific message element according to the method of FIG. 4 by retrieving the value (408) at the memory location specified by adding the identified value for the element offset (328) to the address for the beginning of the message (400) and transmitting the value (408) to the requesting module. The messaging module may transmit the value (408) to the requesting module by transmitting the value (408) to the requesting module as a return value from a function called by the requesting module as in the exemplary 'request_value' function above, sending the value (408) to the requesting module in an XML message using web services, or any other implementation as will occur to those of skill in the art.

In addition to using the message element designator to request a value for a message element in an application message, the requesting module may use the message element designator to request to set a value for a message element in an application message. For further explanation, therefore, FIG. 5 sets forth a flowchart illustrating a further exemplary method of referencing message elements in an application message in a messaging environment according to embodiments of the present invention that includes receiving (500), by the messaging module from the requesting module, a request (502) to store a value (504) for the specific message element in an application message (400).

Figure 5:
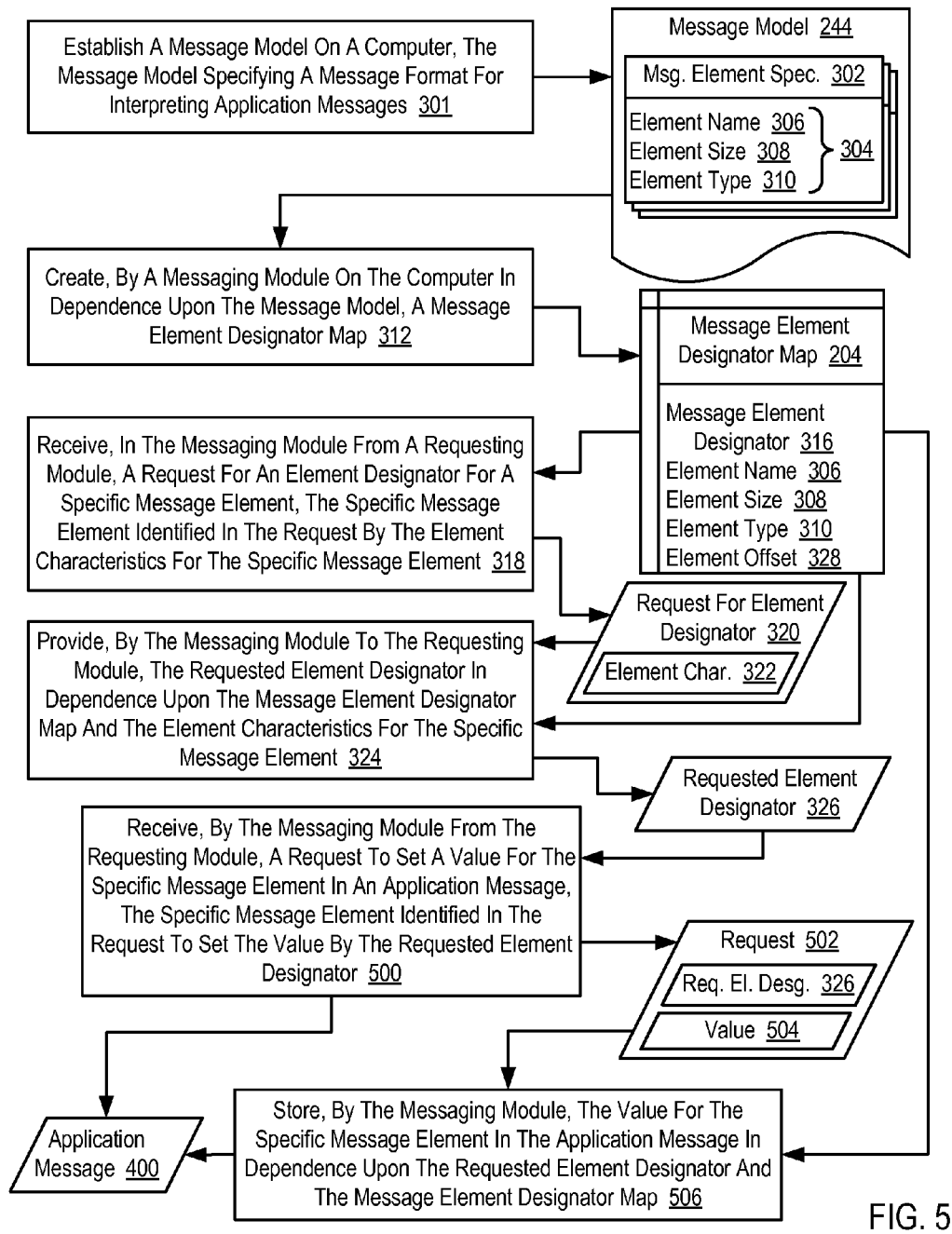
FIG. 5 sets forth a flowchart illustrating a further exemplary method of referencing message elements in an application message in a messaging environment according to exemplary embodiments of the present invention.

The method of FIG. 5 is similar to the method of FIG. 3. That is, the method of FIG. 5 includes establishing (301) a message model (244) on a computer. The message model (244) specifies a message format for interpreting application messages and includes one or more message element specifications (302). Each message element specification (302) of FIG. 5 specifies a message element for storing data in the application messages Each message element specification (302) includes element characteristics (304) consisting of an element name (306), an element size (308), and an element type (310). The method of FIG. 5 is similar to the method of FIG. 3 in that the method of FIG. 5 also includes: creating (312), by a messaging module on the computer in dependence upon the message model (244), a message element designator map (204), the message element designator map (204) mapping a separate message element designator (316) to each message element specified by the message model (244); receiving (318), in the messaging module from a requesting module, a request (320) for an element designator (326) for a specific message element, the specific message element identified in the request by the element characteristics (322) for the specific message element; and providing (324), by the messaging module to the requesting module, the requested element designator (326) in dependence upon the message element designator map (204) and the element characteristics (322) for the specific message element. The message element designator map (204) of FIG. 5 includes a message element designator (316), the element name (306), the element size (308), the element type (310), and the element offset (328).

The method of FIG. 5 also includes receiving (500), by the messaging module from the requesting module, a request (502) to store a value (504) for the specific message element in an application message (400). The specific message element is identified in the request (502) to store the value by the requested element designator (326). The request (502) to store the value (504) for the specific message element in the application message (400) may be implemented as an XML document, a call to a function of an API for the requesting module, or any other implementation as will occur to those of skill in the art. For example, consider the following exemplary function in the API of the requesting module useful for receiving a request to store a value for the specific message element in an application message according to embodiments of the present invention:

int store_value(message*msg, designator dsg, value val);

A requesting device may call the exemplary function 'store_value' above to request to store the value of 'val' in the application message located at computer memory address identified by the value for 'msg.' The particular element of the message into which the value is stored is identified by the message element designator having a value that matches the value for 'dsg.' The exemplary function 'store_value' returns an integer error code after executing the function to indicate whether the 'store_value' function successfully stored the value into the message. Readers will note that the exemplary function described above is for explanation and not for limitation. In fact, other exemplary functions as will occur to those of skill in the art may also be useful in referencing message elements in an application message in a messaging environment according to embodiments of the present invention.

The method of FIG. 5 also includes storing (506), by the messaging module, the value (504) for the specific message element in the application message (400) in dependence upon the requested element designator (326) and the message element designator map (204). The messaging module may store (506) the value (504) for the specific message element in the application message (400) according to the method of FIG. 5 by identifying in the map (204) the value for the element offset (328) associated with the value for the message element designator (316) that matches the value for the requested element designator (326). The messaging module may then store (506) the value (504) for the specific message element in the application message (400) according to the method of FIG. 5 by writing the value (408) in the message (400) at the memory location specified by adding the identified value for the element offset (328) to the address for the beginning of the message (400).

In addition to using the message element designator to request or store a value for a message element in an application message, the requesting module may also use the message element designator to request element characteristics for a message element in an application message. For further explanation, therefore, FIG. 6 sets forth a flowchart illustrating a further exemplary method of referencing message elements in an application message in a messaging environment according to embodiments of the present invention that includes receiving (600), by the messaging module from the requesting module, a request (602) for the element characteristics for the specific message element.

Figure 6:
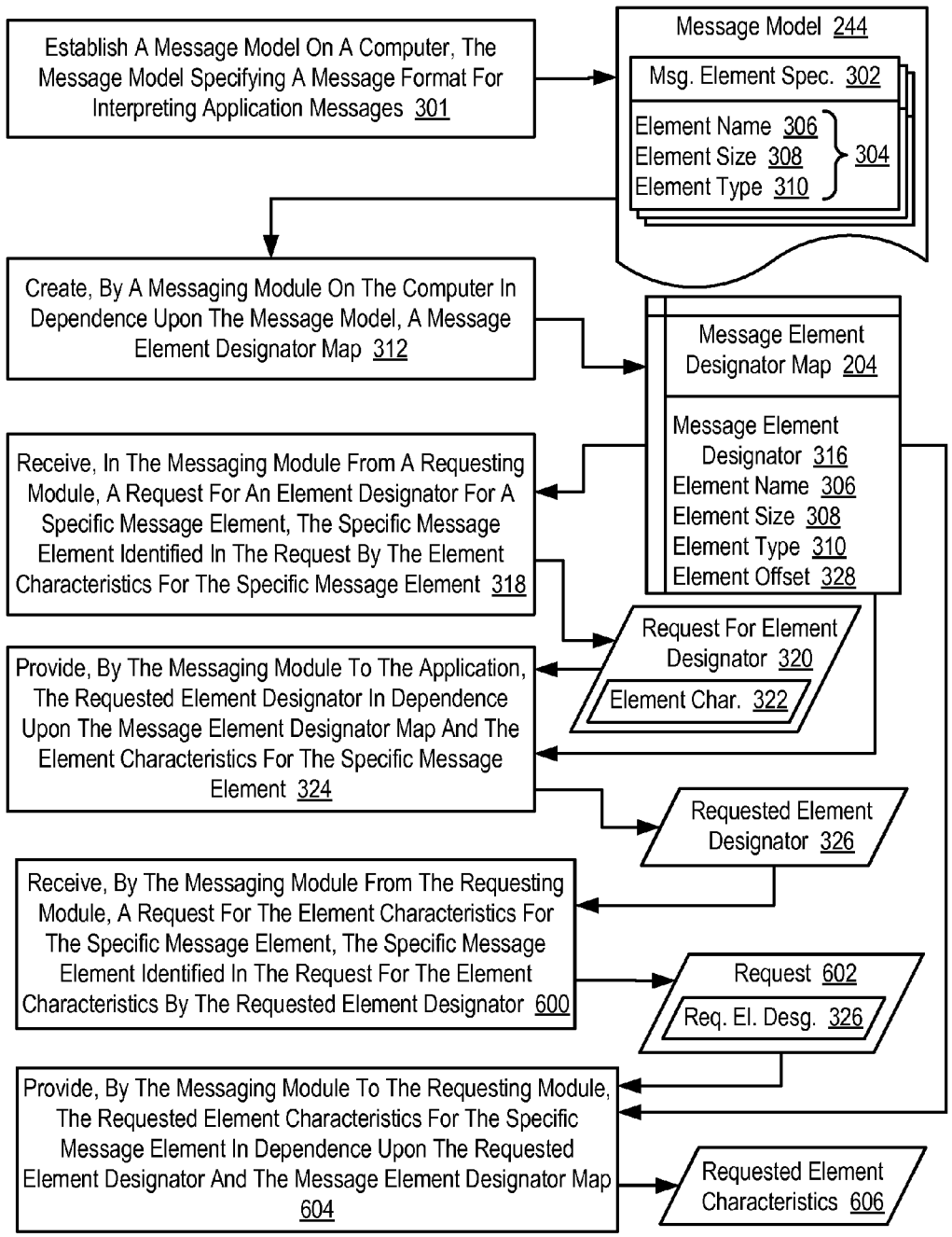
FIG. 6 sets forth a flowchart illustrating a further exemplary method of referencing message elements in an application message in a messaging environment according to exemplary embodiments of the present invention.

The method of FIG. 6 is similar to the method of FIG. 3. That is, the method of FIG. 6 includes establishing (301) a message model (244) on a computer. The message model (244) specifies a message format for interpreting application messages and includes one or more message element specifications (302). Each message element specification (302) of FIG. 6 specifies a message element for storing data in the application messages Each message element specification (302) includes element characteristics (304) consisting of an element name (306), an element size (308), and an element type (310). The method of FIG. 6 is similar to the method of FIG. 3 in that the method of FIG. 6 also includes: creating (312), by a messaging module on the computer in dependence upon the message model (244), a message element designator map (204), the message element designator map (204) mapping a separate message element designator (316) to each message element specified by the message model (244); receiving (318), in the messaging module from a requesting module, a request (320) for an element designator (326) for a specific message element, the specific message element identified in the request by the element characteristics (322) for the specific message element; and providing (324), by the messaging module to the requesting module, the requested element designator (326) in dependence upon the message element designator map (204) and the element characteristics (322) for the specific message element. The message element designator map (204) of FIG. 6 includes a message element designator (316), the element name (306), the element size (308), the element type (310), and the element offset (328).

The method of FIG. 6 also includes receiving (600), by the messaging module from the requesting module, a request (602) for the element characteristics for the specific message element. The specific message element is identified in the request (602) for the element characteristics by the requested element designator (326). The request (602) for the element characteristics for the specific message element may be implemented as an XML document, a call to a function of an API for the requesting module, or any other implementation as will occur to those of skill in the art. For example, consider the following exemplary function in the API of the requesting module useful for receiving a request for element characteristics for the specific message element according to embodiments of the present invention:

element_char request_characteristics(designator dsg, char_ID id);

A requesting device may call the exemplary function 'request_characteristics' above to request element characteristics for the message element identified by the message element designator having a value that matches the value for 'dsg.' The particular characteristic requested is specified by the value for 'id.' The exemplary function 'request_characteristics' returns the value for the particular element characteristic after executing the function. Readers will note that the exemplary function described above is for explanation and not for limitation. In fact, other exemplary functions as will occur to those of skill in the art may also be useful in referencing message elements in an application message in a messaging environment according to embodiments of the present invention.

The method of FIG. 6 also includes providing (604), by the messaging module to the requesting module, the requested element characteristics (606) for the specific message element in dependence upon the requested element designator (326) and the message element designator map (204). The messaging module may provide (604) the requested element characteristics (606) according to the method of FIG. 6 by identifying in the map (204) the values for the element characteristics associated with the value for the message element designator (316) that matches the value for the requested element designator (326). The messaging module may then provide (604) the requested element characteristics (606) according to the method of FIG. 6 by transmitting the values for the requested element characteristics (606) to the requesting module. The messaging module may transmit the values for the requested element characteristics (606) to the requesting module by transmitting the values for the requested element characteristics (606) to the requesting module as return values from a function called by the requesting module as in the exemplary 'request_characteristics' function above, sending the values for the requested element characteristics (606) to the requesting module in an XML message using web services, or any other implementation as will occur to those of skill in the art.

As mentioned above, when the messaging module receives a request from a requesting module for an element designator for a specific message element, the specific message element may be identified in the request by the element characteristics for the specific message element. Often, however, two or more message elements may have the same element characteristics, but the message elements are constituent elements of different parent elements. For example, an application message representing information about a person may include two message elements representing street information for the person. Both street message elements may have the same element characteristics. One street element, however, may have a parent message element that represents a home address for the person, while the second street element has a parent message element that represents an office address for the person. In such an example, each street message element may be identified by both the element characteristics and the message element designator for the parent message element. For further explanation, therefore, FIG. 7 sets forth a flowchart illustrating a further exemplary method of referencing message elements in an application message in a messaging environment according to embodiments of the present invention in which the specific message element is further identified in the request (320) by an element designator (700) for a parent message element.

Figure 7:
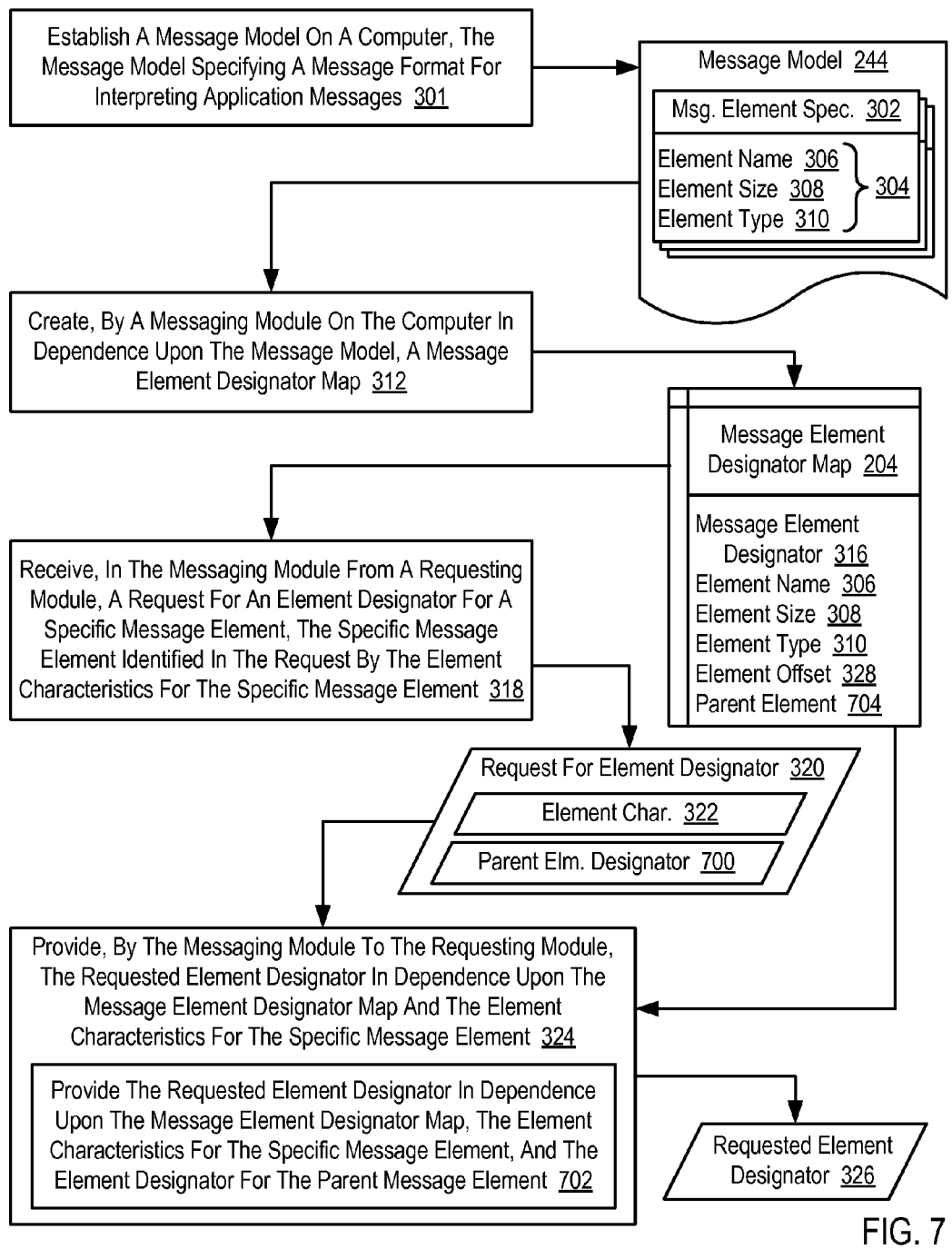
FIG. 7 sets forth a flowchart illustrating a further exemplary method of referencing message elements in an application message in a messaging environment according to exemplary embodiments of the present invention.

The method of FIG. 7 is similar to the method of FIG. 3. That is, the method of FIG. 7 includes establishing (301) a message model (244) on a computer. The message model (244) specifies a message format for interpreting application messages and includes one or more message element specifications (302). Each message element specification (302) of FIG. 7 specifies a message element for storing data in the application messages Each message element specification (302) includes element characteristics (304) consisting of an element name (306), an element size (308), and an element type (310). The method of FIG. 7 is similar to the method of FIG. 3 in that the method of FIG. 7 also includes: creating (312), by a messaging module on the computer in dependence upon the message model (244), a message element designator map (204), the message element designator map (204) mapping a separate message element designator (316) to each message element specified by the message model (244); receiving (318), in the messaging module from a requesting module, a request (320) for an element designator (326) for a specific message element, the specific message element identified in the request by the element characteristics (322) for the specific message element; and providing (324), by the messaging module to the requesting module, the requested element designator (326) in dependence upon the message element designator map (204) and the element characteristics (322) for the specific message element. The message element designator map (204) of FIG. 7 includes a message element designator (316), the element name (306), the element size (308), the element type (310), and the element offset (328).

As mentioned above, the specific message element is further identified in the request (320) of FIG. 7 by an element designator (700) for a parent message element. To utilize the element designator (700) for a parent message element, the messaging module adds a parent element designator (704) field to the message element designator map (204) when the map (204) is created at startup or upon receiving a new message model. The parent element designator (704) field specifies the message element designator for the parent element of each message element in the map (204).

In the method of FIG. 7 providing (324), by the messaging module to the requesting module, the requested element designator (326) in dependence upon the message element designator map (204) and the element characteristics (322) for the specific message element includes providing (702) the requested element designator (326) in dependence upon the message element designator map (204), the element characteristics (322) for the specific message element, and the element designator (700) for the parent message element. The messaging module may provide (702) the requested element designator (326) according to the method of FIG. 7 by identifying in the map (204) the message element designator for the message element having values for element characteristics that match the values for the element characteristics (322) and having a value for the parent element designator (704) that matches the value for the parent element designator (700). The messaging module may provide (702) the requested element designator (326) according to the method of FIG. 7 by transmitting the identified element designator to the requesting module. The messaging module may transmit the identified element designator to the requesting module by transmitting the requested element designator (326) to the requesting module as a return value to a function called by the requesting module from a messaging module API, sending the requested element designator (326) to the requesting module in an XML message using web services, or any other implementation as will occur to those of skill in the art. For example, consider the following exemplary function in the API of the requesting module useful for receiving a request for an element designator for a specific message element according to embodiments of the present invention:

designator request_designator(string name, designator parent_dsg);

A requesting device may call the exemplary function 'request_designator' above to request an element designator for the message element identified by the element characteristic whose value matches the value for 'name' and identified by the parent element designator whose value matches the value for 'parent_dsg.' The exemplary function 'request_designator' returns the message element designator after executing the function. Readers will note that the exemplary function described above is for explanation and not for limitation. In fact, other exemplary functions as will occur to those of skill in the art may also be useful in referencing message elements in an application message in a messaging environment according to embodiments of the present invention.

In view of the explanations set forth above in this document, readers will recognize that referencing message elements in an application message in a messaging environment according to embodiments of the present invention provides the following benefits:

provides performance enhancement by avoiding the use of string operations when accessing message elements of application messages, provides the ability to dynamically create message element designators for direct access to message element characteristics in systems that specify message elements using message models that do not provide direct access to message element characteristics, and prevents sacrificing the performance enhancements of referencing message element characteristics directly in systems that specify message elements using message models that do not provide direct access to message element characteristics.

Exemplary embodiments of the present invention are described largely in the context of a fully functional computer system for referencing message elements in an application message in a messaging environment. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of referencing message elements in an application message in a messaging environment, the method comprising:

establishing a message model on a computer, the message model specifying a message format for interpreting application messages, the message model comprising one or more message element specifications, each message element specification specifying a message element for storing data in the application messages, each message element specification comprising element characteristics that include an element name;

creating, by a messaging module on the computer in dependence upon the message model, a message element designator map, the message element designator map mapping a separate message element designator to each message element specified by the message model, wherein each message element is specified in the message element designator map by the element characteristics of the message element specified in the message model including the element name of the message element;

receiving, in the messaging module from a requesting module, a request for an element designator for a specific message element, the specific message element identified in the request by the element characteristics for the specific message element; and providing, by the messaging module to the requesting module, the requested element designator in dependence upon the message element designator map and the element characteristics for the specific message element.

2. The method of claim 1 further comprising:

receiving, by the messaging module from the requesting module, a request for a value for the specific message element in an application message, the specific message element identified in the request for the value by the requested element designator; and providing, by the messaging module to the requesting module, the value for the specific message element in dependence upon the application message, the requested element designator, and the message element designator map.

3. The method of claim 1 further comprising:

receiving, by the messaging module from the requesting module, a request to store a value for the specific message element in an application message, the specific message element identified in the request to store the value by the requested element designator; and storing, by the messaging module, the value for the specific message element in the application message in dependence upon the requested element designator and the message element designator map.

4. The method of claim 1 further comprising:

receiving, by the messaging module from the requesting module, a request for the element characteristics for the specific message element, the specific message element identified in the request for the element characteristics by the requested element designator; and providing, by the messaging module to the requesting module, the requested element characteristics for the specific message element in dependence upon the requested element designator and the message element designator map.

5. The method of claim 1 wherein:

the specific message element is further identified in the request by an element designator for a parent message element; and providing, by the messaging module to the requesting module, the requested element designator in dependence upon the message element designator map and the element characteristics for the specific message element further comprising providing the requested element designator in dependence upon the message element designator map, the element characteristics for the specific message element, and the element designator for the parent message element.

6. The method of claim 1 wherein the element characteristics comprise an element name.

7. The method of claim 1 wherein the computer is a subscribing client device, the method further comprising brokering, by a stream administration server, establishment of a message stream from a feed adapter to the subscribing client device, the message stream providing the application messages from the feed adapter to the subscribing client device.

8. The method of claim 1 wherein the messaging environment is a financial market data environment and wherein the application messages comprise financial market data.

9. A system for referencing message elements in an application message in a messaging environment, the system comprising one or more computer processors, a computer memory operatively coupled to the one or more computer processors, the computer memory having disposed within it computer program instructions capable of:

establishing a message model on a computer, the message model specifying a message format for interpreting application messages, the message model comprising one or more message element specifications, each message element specification specifying a message element for storing data in the application messages, each message element specification comprising element characteristics that include an element name;

creating, by a messaging module on the computer in dependence upon the message model, a message element designator map, the message element designator map mapping a separate message element designator to each message element specified by the message model, wherein each message element is specified in the message element designator map by the element characteristics of the message element specified in the message model including the element name of the message element;

receiving, in the messaging module from a requesting module, a request for an element designator for a specific message element, the specific message element identified in the request by the element characteristics for the specific message element; and providing, by the messaging module to the requesting module, the requested element designator in dependence upon the message element designator map and the element characteristics for the specific message element.

10. The system of claim 9 further comprising computer program instructions capable of:

receiving, by the messaging module from the requesting module, a request for a value for the specific message element in an application message, the specific message element identified in the request for the value by the requested element designator; and providing, by the messaging module to the requesting module, the value for the specific message element in dependence upon the application message, the requested element designator, and the message element designator map.

11. The system of claim 9 further comprising computer program instructions capable of:

receiving, by the messaging module from the requesting module, a request to store a value for the specific message element in an application message, the specific message element identified in the request to store the value by the requested element designator; and storing, by the messaging module, the value for the specific message element in the application message in dependence upon the requested element designator and the message element designator map.

12. The system of claim 9 further comprising computer program instructions capable of:

receiving, by the messaging module from the requesting module, a request for the element characteristics for the specific message element, the specific message element identified in the request for the element characteristics by the requested element designator; and providing, by the messaging module to the requesting module, the requested element characteristics for the specific message element in dependence upon the requested element designator and the message element designator map.

13. The system of claim 9 wherein:

the specific message element is further identified in the request by an element designator for a parent message element; and the computer program instructions capable of providing, by the messaging module to the requesting module, the requested element designator in dependence upon the message element designator map and the element characteristics for the specific message element further comprises computer program instructions capable of providing the requested element designator in dependence upon the message element designator map, the element characteristics for the specific message element, and the element designator for the parent message element.

14. The system of claim 9 wherein the computer is a subscribing client device, the system further comprising computer program instructions capable of brokering, by a stream administration server, establishment of a message stream from a feed adapter to the subscribing client device, the message stream providing the application messages from the feed adapter to the subscribing client device.

15. A computer program product for referencing message elements in an application message in a messaging environment, the computer program product disposed upon a recordable medium, the computer program product comprising computer program instructions capable of:

establishing a message model on a computer, the message model specifying a message format for interpreting application messages, the message model comprising one or more message element specifications, each message element specification specifying a message element for storing data in the application messages, each message element specification comprising element characteristics that include an element name;

creating, by a messaging module on the computer in dependence upon the message model, a message element designator map, the message element designator map mapping a separate message element designator to each message element specified by the message model, wherein each message element is specified in the message element designator map by the element characteristics of the message element specified in the message model including the element name of the message element;

receiving, in the messaging module from a requesting module, a request for an element designator for a specific message element, the specific message element identified in the request by the element characteristics for the specific message element; and providing, by the messaging module to the requesting module, the requested element designator in dependence upon the message element designator map and the element characteristics for the specific message element.

16. The computer program product of claim 15 further comprising computer program instructions capable of:

receiving, by the messaging module from the requesting module, a request for a value for the specific message element in an application message, the specific message element identified in the request for the value by the requested element designator; and providing, by the messaging module to the requesting module, the value for the specific message element in dependence upon the application message, the requested element designator, and the message element designator map.

17. The computer program product of claim 15 further comprising computer program instructions capable of:

receiving, by the messaging module from the requesting module, a request to store a value for the specific message element in an application message, the specific message element identified in the request to store the value by the requested element designator; and storing, by the messaging module, the value for the specific message element in the application message in dependence upon the requested element designator and the message element designator map.

18. The computer program product of claim 15 further comprising computer program instructions capable of:

receiving, by the messaging module from the requesting module, a request for the element characteristics for the specific message element, the specific message element identified in the request for the element characteristics by the requested element designator; and providing, by the messaging module to the requesting module, the requested element characteristics for the specific message element in dependence upon the requested element designator and the message element designator map.

19. The computer program product of claim 15 wherein:

the specific message element is further identified in the request by an element designator for a parent message element; and providing, by the messaging module to the requesting module, the requested element designator in dependence upon the message element designator map and the element characteristics for the specific message element further comprising providing the requested element designator in dependence upon the message element designator map, the element characteristics for the specific message element, and the element designator for the parent message element.

20. The computer program product of claim 15 wherein the computer is a subscribing client device, the computer program product further comprising computer program instructions capable of brokering, by a stream administration server, establishment of a message stream from a feed adapter to the subscribing client device, the message stream providing the application messages from the feed adapter to the subscribing client device.

* * * * *